United States Patent [19]

Fowler

[11] 3,744,732
[45] July 10, 1973

[54] VEHICLE SEAT BELTS AND HARNESSES
[75] Inventor: John Edward Fowler, Abingdon, England
[73] Assignee: Pressed Steel Fisher Limited, Cowley, Oxford, England
[22] Filed: July 20, 1971
[21] Appl. No.: 164,333

[30] Foreign Application Priority Data
July 29, 1970 Great Britain.................. 36,614/70

[52] U.S. Cl. 242/107 SB, 200/61.58 SB, 280/150 SB, 297/388
[51] Int. Cl. ........................................... A62b 35/00
[58] Field of Search ................. 242/107 R, 107 SB, 242/107.4, 107.5, 107.6, 107.7; 280/150 SB; 207/388, 389; 200/61.58 SB

[56] References Cited
UNITED STATES PATENTS

| | | | |
|---|---|---|---|
| 3,381,268 | 4/1968 | Boblitz | 242/107.4 X |
| 3,375,495 | 3/1968 | Burns | 200/61.58 SB |
| 3,519,771 | 7/1970 | Burns | 200/61.58 SB |
| 3,371,736 | 3/1968 | Lewis et al. | 242/107 SB |

Primary Examiner—Werner H. Schroeder
Attorney—Harold T. Stowell, Thomas J. Greer, Jr. et al.

[57] ABSTRACT

A vehicle seat belt or harness is connected to an inertia-locking spool that includes switch means operated when a predetermined amount of belt is withdrawn from the spool such as occurs when the belt is correctly worn. The switch may be connected to energize an alarm, or to immobilize the vehicle, if an attempt is made to start the vehicle, or drive it at above a certain speed, without sufficient belt having been withdrawn. The switch may be operated either by the belt or harness that is wound around the spool, or by the rotation of the spool itself as belt or harness is unwound therefrom. The operation of the switch may also be controlled by the position of a vehicle seat with which the belt is associated to alter the predetermined amount of belt that must be withdrawn and thereby compensate for fore and aft adjustment of the seat.

4 Claims, 5 Drawing Figures

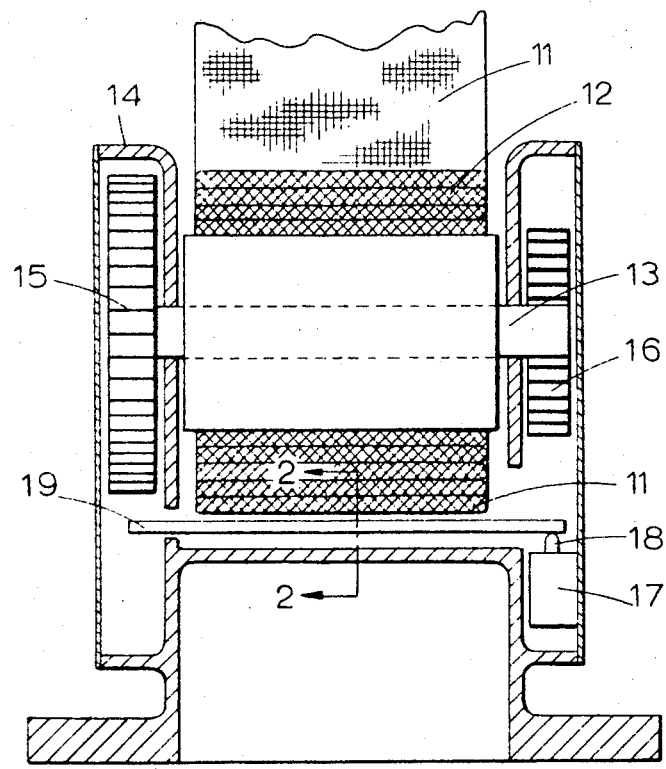
Fig. 1.
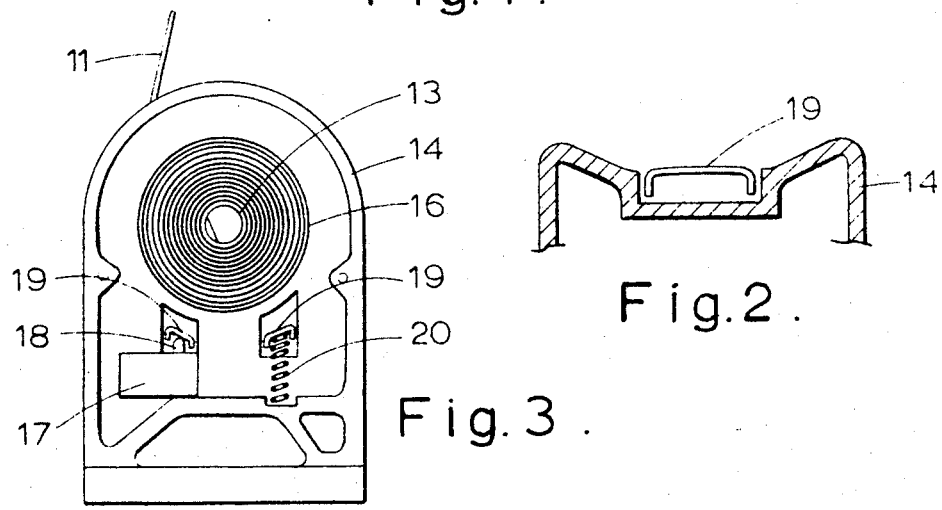
Fig. 2.
Fig. 3.

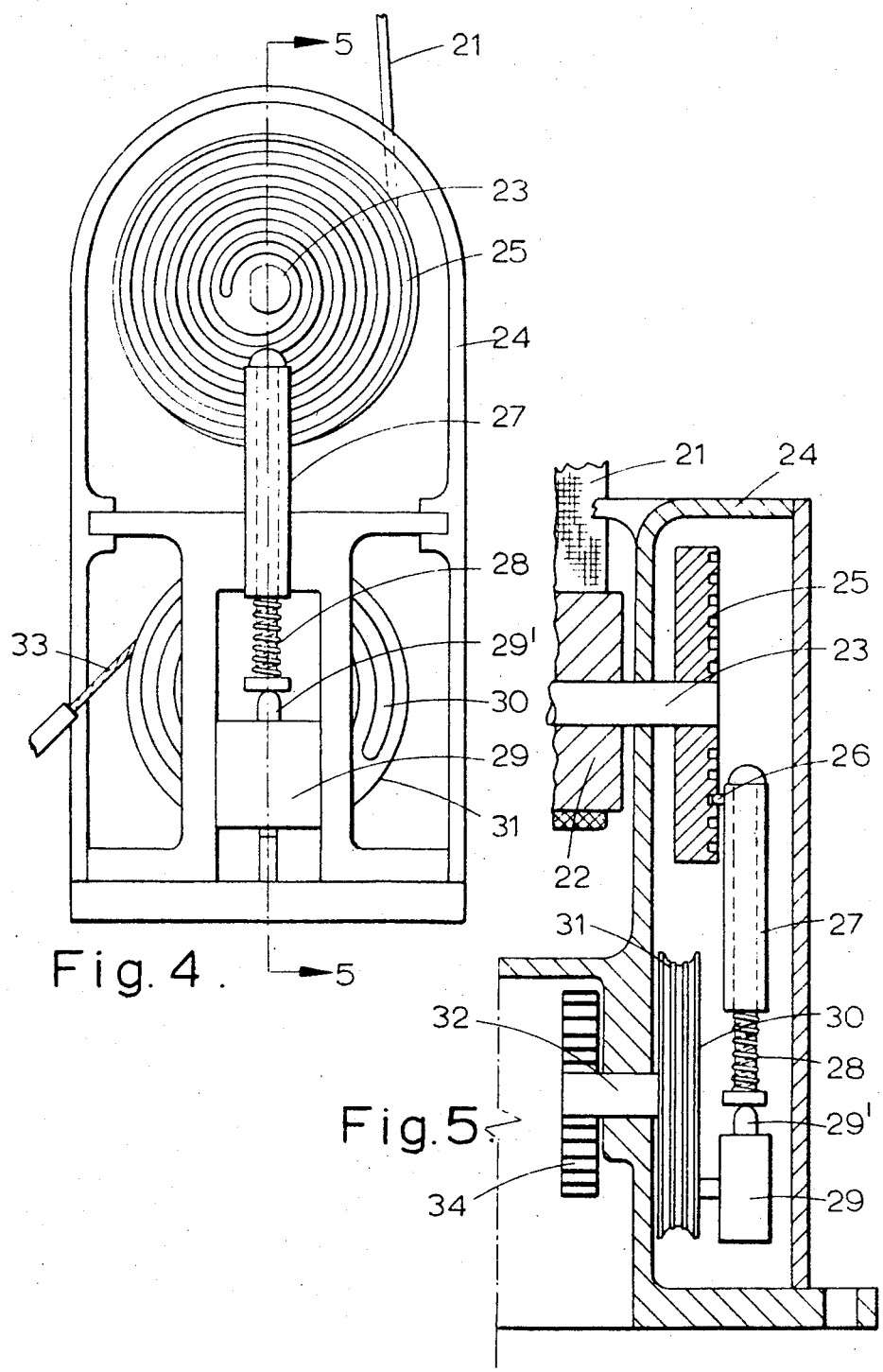

VEHICLE SEAT BELTS AND HARNESSES

This invention relates to vehicle seat belts and harnesses and concerns in particular a seat belt or harness that incorporates a safety device which can immobilise the vehicle unless the belt or harness is worn.

It has been shown that the wearing of a properly fitted seat belt or harness is one of the major factors that can reduce injury in the event of a vehicular accident. However, it is well known that many drivers do not wear the belt or harness fitted to their vehicles.

In order to ensure that a driver does wear his belt or harness it has been proposed that the buckle or other fastening of the belt or harness should incorporate a device that immobilises the vehicle unless the buckle or fastening is properly secured together.

Such an arrangement is not completely fool-proof since it appears that a driver can secure the buckle or fastening before he sits down and then simply sit on the belt or harness.

According to this invention a vehicle seat belt or harness includes an inertia-locking spool for taking up any slack in the belt or harness, and switch means adapted to be operated only when a predetermined amount of belt or harness has been unwound from the spool.

Thus it should be understood that a seat belt or harness according to the invention may be so fitted to a vehicle that until sufficient belt or harness has been unwound to indicate that the belt or harness is being worn as opposed to being sat on, the switch means immobilises the vehicle, and/or operates an alarm if an attempt is made to start the vehicle or drive it at above a certain speed.

For example, the switch means may be connected to immobilise the vehicle by, for example, preventing operation of the starter motor or the ignition, and the arrangement may be such that the switch means is not operated to allow the vehicle to be started or run until such an amount of belt or harness has been unwound as would be unwound by a 5th percentile female wearing the belt or harness.

Alternatively the switch means may be connected to an audible and/or visual alarm system which is energised by the ignition switch, the starter switch and/or a speed sensitive switch to operate until, or unless, the above amount of belt or harness has been unwound.

To cater for cases where the seat belt or harness is to be worn by drivers smaller than 5th percentile females the point of operation of the switch may be made adjustable but preferably, in order to avoid unauthorised tampering, special embodiments of the invention should be available.

The switch means may be operated by a member that bears directly on the belt wound around the spool, or alternatively, to save wear occuring on the belt, the switch means may include an operating member that is actuated by rotation of the spool itself as belt or harness is unwound from the spool.

Preferably compensating means are also provided to alter the predetermined amount of belt or harness that must be unwound from the spool to operate the switch in accordance with the fore and aft adjusted position of the seat with which the belt is to be associated.

The invention will now be described by way of example with reference to the accompanying drawings in which FIG. 1 is a schematic sectional view of belt and inertia-locking spool;

FIG. 2 is a section of part of the spool shown in FIG. 1 taken on the line 2—2 in FIG. 1;

FIG. 3 is an end view of the belt and spool shown in FIG. 1;

FIG. 4 is a schematic end view of an alternative belt and spool; and

FIG. 5 is a fragmentary sectional view of the belt and spool shown in FIG. 4 and taken on the line 5—5 in FIG. 4.

Referring to FIGS. 1, 2 and 3, a seat belt 11 is connected at one end to a spool 12. The spool 12 is mounted on a spindle 13 within a housing 14 and the spindle is connected in known manner at one end to a locking gear 15 and at the other end to a belt return spring 16.

Mounted in the housing 14 is a snap-action push button switch 17 with the push button 18 abutting a switch operating lever 19 which is pivotted within the housing 14 and is urged against the belt wound around the spool 12 by a return spring 20.

In use the housing 14 is mounted in conventional manner in the vehicle and the arrangement is such that the switch 17 is connected to the vehicle's ignition system or an alarm system as required.

When the belt 11 is not being worn the belt return spring 16 rotates the spool 12 to take up the slack in the belt 11 and sufficient belt 11 is wound around the spool 12 to ensure that operating lever 10 holds the switch either open or closed according to the design and required function of the switch.

As the belt is put on, belt 11 is unwound from the spool 12 allowing the operating lever 19 to be moved towards the spool 12 by the return spring 20.

When the belt has been correctly fastened around a normal person occupying the seat with which the belt is associated sufficient belt has been unwound from the spool to allow the operating lever 19 to trip the switch 17 thereby reversing its state and either allowing the vehicle to be started or over-riding any alarm system.

Referring now to the embodiment shown in FIGS. 4 and 5, a seat belt 21 is connected at one end to a spool 22. The spool 22 is mounted on a spindle 23 within a housing 24 and one end of the spindle is connected to a conventional locking gear and return spring (not shown) whilst the other end is connected to a face cam 25.

The face cam 25 is engaged by a follower pin 26 of a telescopic follower 27 which includes a spring 28 urging the follower 27 into its extended state and which is guided for reciprocatory movement within the housing 24.

The follower 27 engages the push button 29' of a snap action push button switch 29 which is also slidable within the housing 24.

The switch 29 engages the cam track of a face cam 30 formed on a pulley 31 which is mounted on a shaft 32.

The pulley 31 is connected to a cable 33 which tends to be wound around the pulley by a return spring 34.

In use the housing 24 is mounted in a vehicle in conventional manner and the end of the cable 33 is connected to the vehicle seat with which the belt is associated, or to a part of the seat linkage, so that fore and aft adjustment of the seat unwinds cable 33 from the pulley 31 or allows the return spring 34 to wind further cable around the pulley; the consequential rotation of the pulley 31 cause the switch 29 to be moved by the face cam 30 respectively away from and toward the follower 27.

When the belt 21 is not being worn, the return spring connected to the spindle 23 rotates the spindle to take up the slack in the belt and thereby also rotates the face cam 25 which moves the follower 27 away from the switch 29.

As the belt 21 is withdrawn from the housing 24 the spindle is rotated in the opposite direction thereby causing face cam 25 to move the follower 27 towards the switch 29.

When sufficient belt 11 has been withdrawn to allow the belt to be correctly fastened, the follower 27 operates the switch 29. Any excess withdrawal of belt, such as may occur when for example the seat occupant reaches forward, is accommodated by telescoping of the follower 27 against the spring 28.

The cam track of face cam 30 is arranged in conjunction with the degree of movement of cable 33 caused by fore and aft adjustment of the seat so that it moves the switch the correct amount to alter the amount of belt that must be withdrawn to operate the switch in accordance with the amount of belt that a normal seat occupant would require in any adjusted fore and aft position of the seat and thereby compensate for any such seat adjustment.

What is claimed is:

1. In a motor vehicle, a seat belt system which includes
   a. a seat mounted in a vehicle for adjustable fore and aft movement,
   b. an automatically retractable seat belt mounted in the vehicle, for use by an occupant of said seat,
   c. a rotatable spool connected to one end of said belt for taking up any slack in said belt, said spool being fore and aft fixed relative to said vehicle,
   d. a switch coupled to said spool and actuable with its rotation and adapted to operate only when a predetermined amount of belt has been withdrawn from said spool,
   e. compensating means coupled to said seat and said switch for altering said predetermined amount of belt that has to be withdrawn to operate the switch in accordance with the fore and aft adjusted position of said seat.

2. A seat belt system according to claim 1 wherein said compensating means includes
   a. said switch coupled to said spool by means of a follower,
   b. said switch moved towards and away from said follower by movement of said adjustable seat relative to said spool.

3. The seat belt system of claim 2 wherein,
   a. said switch is movable along a guideway by means of a cam which it abuts, said cam being actuated by motion of said adjustable seat relative, fore and aft, to said vehicle.

4. The seat belt system of claim 3 wherein,
   a. said spool carries a rotatable cam engaged with one end of said follower, whereby rotation of the spool moves the follower towards or away from the switch,
   b. and wherein a cable connects said adjustable seat to said switch-abutting cam, whereby when the cable is moved by fore and aft adjustment of the seat the switch-abutting cam moves the switch relative to the follower.

* * * * *